Oct. 31, 1933.　　　　J. M. HOTHERSALL　　　　1,932,407
METHOD OF PRODUCING ONE-PIECE DRAWN CONTAINERS
Filed April 9, 1931　　　6 Sheets-Sheet 1

INVENTOR
John M. Hothersall
BY John C. Carpenter
ATTORNEY

Oct. 31, 1933.   J. M. HOTHERSALL   1,932,407
METHOD OF PRODUCING ONE-PIECE DRAWN CONTAINERS
Filed April 9, 1931   6 Sheets-Sheet 2

INVENTOR
John M. Hothersall
BY
John C. Carpenter
ATTORNEY

Oct. 31, 1933.  J. M. HOTHERSALL  1,932,407
METHOD OF PRODUCING ONE-PIECE DRAWN CONTAINERS
Filed April 9, 1931  6 Sheets-Sheet 3

INVENTOR
BY John M. Hothersall
John C. Carpenter
ATTORNEY

Oct. 31, 1933.  J. M. HOTHERSALL  1,932,407
METHOD OF PRODUCING ONE-PIECE DRAWN CONTAINERS
Filed April 9, 1931  6 Sheets-Sheet 5

INVENTOR
John M. Hothersall
BY
John C. Carpenter
ATTORNEY

Oct. 31, 1933.   J. M. HOTHERSALL   1,932,407
METHOD OF PRODUCING ONE-PIECE DRAWN CONTAINERS
Filed April 9, 1931   6 Sheets-Sheet 6

INVENTOR
John M. Hothersall
BY John C. Carpenter
ATTORNEY

Patented Oct. 31, 1933

1,932,407

UNITED STATES PATENT OFFICE 1,932,407

METHOD OF PRODUCING ONE-PIECE DRAWN CONTAINERS

John M. Hothersall, Brooklyn, N. Y., assignor to American Can Company, New York, N. Y., a corporation of New Jersey Application April 9, 1931. Serial No. 528,727

10 Claims. (Cl. 113—42)

The present invention relates to an improved method of producing drawn sheet metal containers and has particular reference to a series of operations for outlining, severing and blanking a sheet to produce container blanks and for drawing the blank into container form with minimum waste of material.

The principal object of the invention is the provision of a method of manufacture of a one-piece drawn container which first prepares a sheet to contain a maximum number of container blank spaces with a minimum of excess or waste material and which then removes the individual container blanks and forms them into drawn containers.

An important object of the invention is the provision of such a method wherein the sheet, from which the containers are formed, is first shaped to outline a series of strips, including only a negligible waste of usable material therein, after which, the strips are severed from the formed sheet in a shape suitable for economic handling by automatic means, each strip being further sub-divided and the sub-divisions drawn into containers.

An important object of the invention is the provision of such a method utilizing the same mechanism for two blanking operations on a sheet thereby economically preparing it for subsequent cutting into strips containing container blanks from which the drawn containers are then formed.

A further important object of the invention is the provision of a method of blanking strips from sheet material and cutting container blanks therefrom in the formation of drawn containers, the blanking and cutting operations being performed without the creation of a waste skeleton and with a minimum of wastage of material.

Numerous other objects of the invention will be apparent as it is better understood from the following description, which, taken in connection with the accompanying drawings, discloses a preferred embodiment thereof.

Referring to the drawings.

Figure 1:
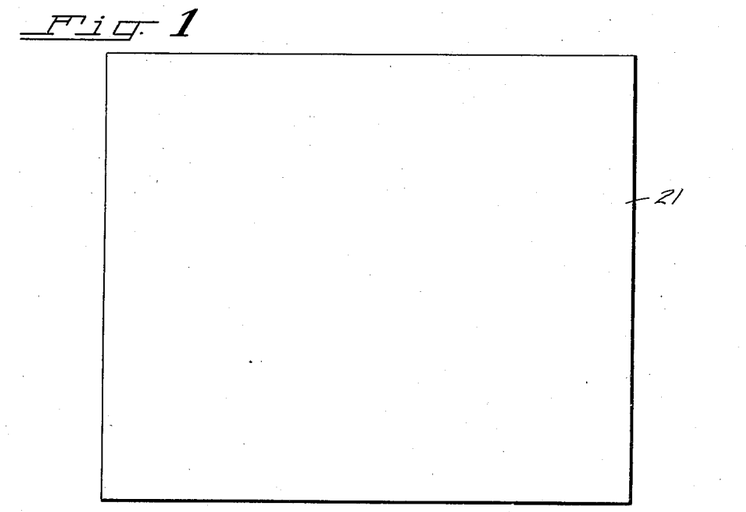
Figure 1 is a plan view of a sheet, adaptable for use in the manufacture of drawn containers according to the present invention.
Figures 6, 7:
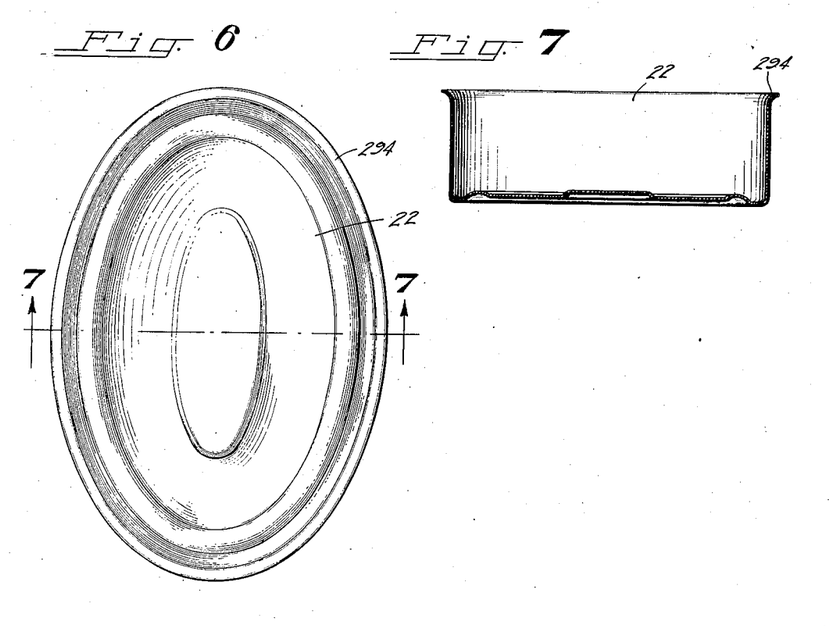
Fig. 6 is a top plan view of a drawn container.
Fig. 7 is a sectional view taken substantially along the line 7—7 of Fig. 6.

For purposes of illustration of the invention, a drawn container of oval shape is selected and the various operations about to be described, which take place on a sheet 21, (Fig. 1) provide the sheet with scroll or undulating edges forming it first into a sheet blank, which is subdivided into strips from which individual container blanks are removed and drawn to provide the finished drawn container, designated by the numeral 22, in Figs. 6 and 7. It will be evident that different layouts for cutting will be necessary for different shapes of containers being drawn, the drawings illustrating merely one kind of typical container and the formative steps of the present invention.

Figure 2:
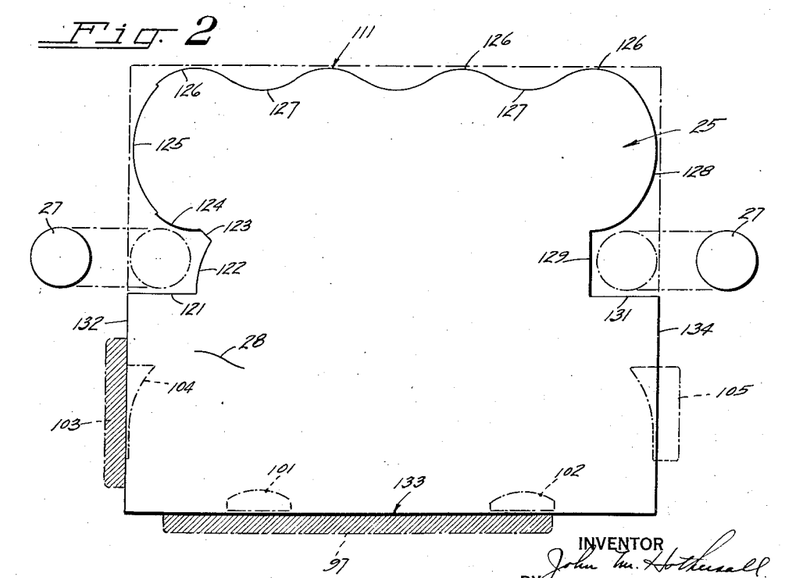
Fig. 2 is a diagrammatic view, showing the sheet after the first operation and showing certain gaging parts of the mechanism used in this first operation, recovery pieces cut from the sheet at such a time being shown in a separated position.
Figure 3:
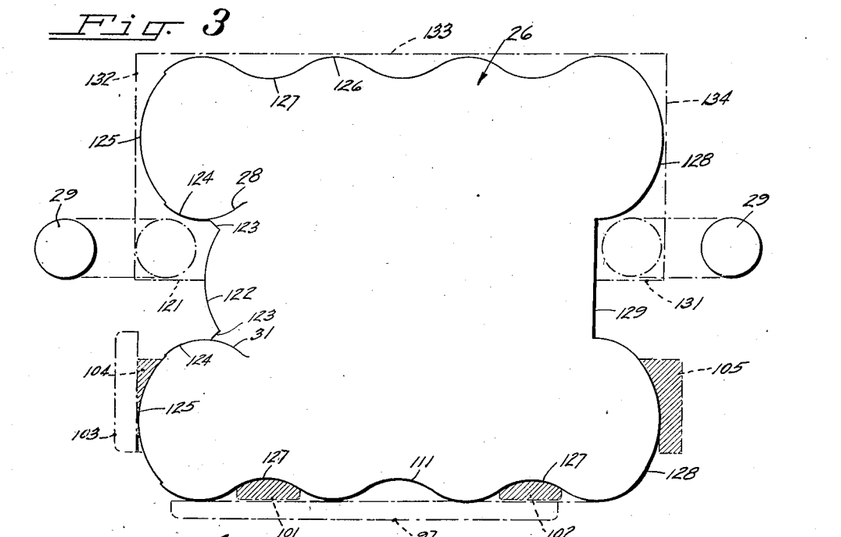
Fig. 3 is a view similar to Fig. 2 illustrating the blank as formed at the end of the second operation, the mechanism used for the first and second operations being the same but the gaging parts used being different as indicated.

The sheet 21 (Fig. 1) is first fed to a scroll shearing mechanism which operates in large part upon half of the sheet by removing parts adjacent its edges producing the shape illustrated in Fig. 2 and designated by the numeral 25. This partially formed sheet is then turned over and its opposite half is subjected to the same shearing mechanism which duplicates the edge outline on the other half of the sheet and converts the sheet 25 into a blank 26 (Fig. 3).

During the first shearing operation on the first half of the sheet, recovery pieces 27 (Fig. 2) are removed, these being taken from those portions of the sheet not used in the subsequent formation into the drawn containers 22. At the same time a relatively short slit 28 is cut in the section of the sheet not being outlined this slit functioning for a purpose hereinafter more fully described.

During the second shearing operation just described, wherein the blank 26 is produced (Fig. 3), recovery pieces 29 are removed from the half of the sheet being then outlined, these corresponding to the recovery pieces 27 formerly cut from the other half of the sheet. At the same time, a short slit 31 is cut in the half-section of the sheet previously outlined, this slit communicating with a part of the out-line of the blank at this place.

The blank 26 is then placed into a second shearing mechanism which cuts spaced lines of severance 32 (Fig. 4) dividing the blank 26 into a pair of side strips 33 and a single center strip 34.

Strip 33 or 34 (Fig. 5) is then individually presented to a drawing press mechanism where an end of the strip is progressively removed to provide container blanks 35. Each blank, in the same machine and as a continuation of the same cycle of movements, is immediately drawn into the container 22 completing the operations of the present method.

Figure 8:
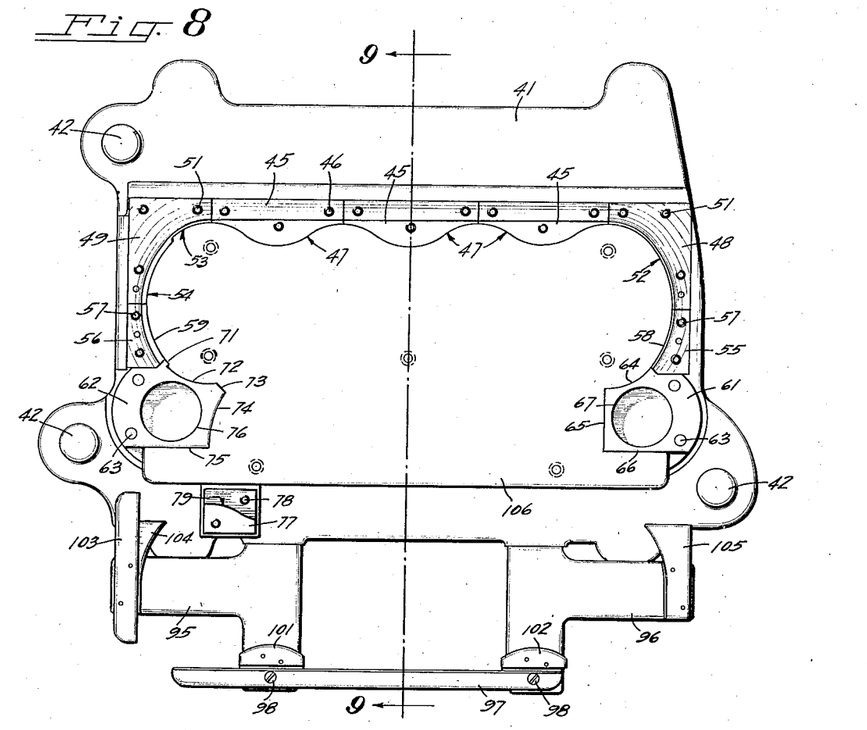
Fig. 8 is a plan view of a conventional type of scroll shearing mechanism for performing first and second operations.
Figure 9:
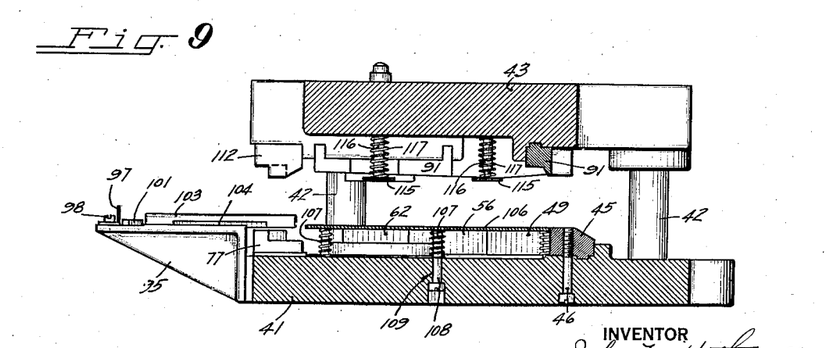
Fig. 9 is a transverse section of the same being taken substantially along the line 9—9 in Fig. 8.

The mechanism for shearing the sheet 21 in its first and second operations and providing first the formed sheet 25 and then the blank 26 is illustrated in a general way in Figs. 8 and 9. This mechanism may be of the usual type of metal shearing machine and comprises a bolster plate 41 on which the stationary shearing die parts are mounted. Such a bolster plate preferably carries a series of upwardly extending pilots or pillar posts 42 and the movable parts of the shearing mechanism are carried on a movable slide 43 which has sliding engagement with the posts 42 by which they are aligned for proper shearing operation.

The bolster plate carries a series of die members 45 rigidly held in position by bolts 46, each die member 45 being provided with a scroll or undulating cutting edge 47. Corner dies 48, 49 are also mounted on the bolster plate 41 being held in position by bolts 51. The die 48 has a cutting edge 52 which unites with and forms an extension of the cutting edge 47 on one side of the machine, this cutting edge 52 being of oval shape. In like manner the die 49 is provided with two cutting edges 53, 54 the former forming an extension of the scroll edge 47 while the latter jogs a slight distance inwardly from the cutting edge 53 for a purpose hereinafter described. The cutting edges 53, 54 are also of oval shape.

Die members 55, 56 are also mounted on the bolster plate being held in position by bolts 57, the die 55 having a cutting edge 58 which forms a continuation of the cutting edge 52 further carrying out half of the curve of the oval at that position. In like manner the die 56 has a cutting edge 59 which forms a continuation of the cutting edge 54, extending the half oval shape on that side of the machine.

Recovery dies 61, 62 are also mounted on the bolster plate being held in position by bolts 63. The die 61 is provided with a curved cutting edge 64 which forms a continuation of the cutting edge 58 completing a half-oval shape of cutting wall. This die also has straight cutting edges 65, 66 arranged at right angles to each other. A circular cutting edge 67 is formed interiorly of the die 61 for effecting the removal of the recovery pieces as will be further described in the description of operation to follow.

In a similar manner the die 62 is provided with curved cutting edges 71, 72, the former being an extension of the cutting edge 59 of the die 56 and the latter being slightly jogged out of alignment with the edge 71 for a purpose hereinafter described, these cutting walls completing a general half oval shape on that side of the machine. This die is further provided with an angular cutting edge 73, a curved cutting edge 74 and a straight cutting edge 75. A circular cutting edge 76 is also formed interiorly of the die member 62 for removing a recovery piece on that side of the blank.

A detached die member 77 is mounted along one side of the bolster plate 41 and is held in position by bolts 78, this die being located toward the left of a center line and toward the front of the apparatus (Fig. 8). The die 77 is provided with a curved cutting edge or wall 79 for producing the slit briefly referred to.

The cutting edges of the various dies just described are adapted to cooperate with corresponding and aligned cutting edges of die members carried by the slide 43. These upper dies are indicated collectively by the numeral 91 (Fig. 9), it being understood that each lower die has its companion, mating upper punch die.

A feed table is provided along the front side of the shearing mechanism and comprises brackets 95 and 96 secured to the front of the bolster plate 41. A front gage is mounted on the table being formed by an angle iron 97 extending between the brackets 95, 96 and being held in place by bolts 98. Rounded gage blocks 101, 102 are also mounted on the table in front of the angle iron 97 being secured to the respective brackets 95, 96. The tops of these blocks are lower than the top edge of the angle iron 97.

The sheet 21 when first positioned in the shearing mechanism is placed over the dies carried on the bolster plate 41 with its front edge against the gage 97 and resting on top of the gage blocks 101, 102. The left-hand edge of the sheet 21 (viewing the machine in Fig. 8) is moved into engagement with a gaging bar 103 secured to the bracket 95, this edge of the sheet resting on top of a gage block 104 formed as an integral part of the bar 103, its upper surface being beneath the upper surface of the bar. In this first cutting position, the right-hand side of the sheet rests on top of a gage block 105 carried by the bracket 96.

The rear section of the sheet extending over the lower dies on the bolster plate, is supported by a plate 106 (Figs. 8 and 9) which is formed to fit accurately inside of the scroll cutting edges of the dies, the plate being supported on springs 107 surrounding bolts 108 passing downwardly through the bolster plate and having sliding movement within vertical bores 109 formed therein.

The first shearing operation is performed by a lowering of the slide 43 and by cooperation between the dies 91 carried thereby and the stationary dies on the bolster plate. Some of these dies 91 cooperate with the cutting edges 67, 76 of the respective dies 61, 62 to remove the recovery pieces 27 from the sheet while the rear edge of the sheet is trimmed and outlined with the scroll or undulating edge indicated generally by the numeral 111 (Fig. 2). Simultaneously with this shaping of the sheet and the removal of the recovery pieces, die 112 carried on the slide 43 and forming a part of the die system 91 cooperates with the die 77 and presses through the sheet at that place sufficiently to form the slit 28.

In this downward movement of the slide member 43, stripper plates 115 carried on the lower end of bolts 116 engage the upper surface of the sheet and hold it against the plate 106. These plates 115 are slightly lower or in advance of the dies carried by the slide and upon engagement with the sheet, the bolts 116 and plates 115 are raised against the action of springs 117 which surround the bolts 116.

This construction provides that the sheet during shearing is yieldingly held between the plate 106 and the plates 115. After the cutting operation and as the slide 43 is again moved upwardly to disengage its dies 91 from the sheet, the springs 107 restore the plate 106 to its normal raised position and the springs 117 push downwardly on the plates 115 and strip the sheet from the dies.

The first shearing operation just described produces the sheet 25 (Fig. 2) and its scroll edge outline 111 beginning at the left-hand middle part of the sheet comprises a straight edge 121, a curved edge 122, an angular edge 123, a curved oval edge 124 and an oval inset edge 125 which connects at its upper end with an undulating scroll line comprising four crests 126 and three intermediate troughs 127. The right-hand crest 126 connects with an oval edge 128 extending into a straight vertical edge 129 leading to a straight edge 131 formed at right angles thereto and arranged directly opposite the straight edge 121.

The inset edge 125 constitutes the rear edge of a strip 33 subsequently removed from the sheet and is set back to prevent slivering in the final blanking operation which will be more fully described in connection with the later description of that operation.

During the production of this outline the sheet was properly gaged on its side by the bar 103 engaging a straight edge 132 connecting with the edge 121. The front gage 97 engaged a straight edge 133 at such time and a side edge 134 resting on and adjacent to the gage block 105, as indicated in Fig. 2.

For the second shearing operation of the die mechanism, the sheet 25 is turned over so that its shaped half-section is on front of the shearing apparatus and the long side of its scroll shape edge 111 is adjacent the gage member 97. The two outer trough edges 127 are then brought into engagement with the gage blocks 101, 102, this portion of the sheet during this cutting action resting in a slightly lower plane. This gaged position is graphically indicated in Fig. 3. The oval edge 125 is then brought into engagement with the gage block 104.

The gage members 101, 102, 104, 105 are all shaped to closely fit the contour of the sheet as it is placed in cutting position and this registers and properly holds the sheet for the subsequent shearing operation. The rear half of the sheet outlined by its edges 132, 133, 134 now extends beyond the cutting edges of the lower dies and the sheet is again resting upon the plate 106. The slide 43 is now lowered and the blank 26, (Fig. 3) is formed. At the same time, the recovery pieces 29 are removed from that portion of the sheet which is not embodied in the blank 26, the slot 31 being also formed in the blank.

Figure 10:
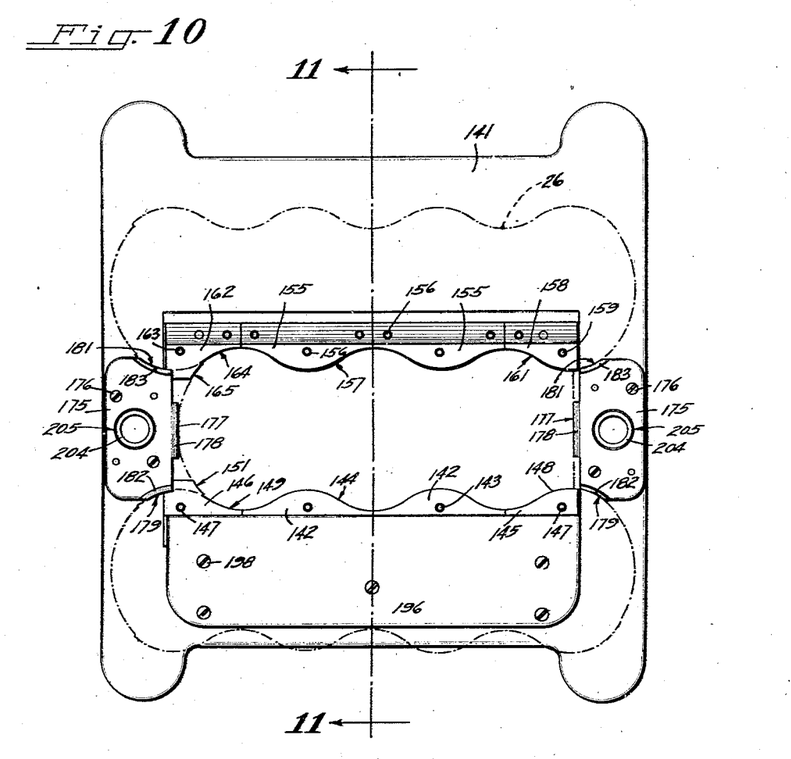
Fig. 10 is a plan view of a conventional type of scroll cutting or shearing mechanism for performing the third operation of removing the strips from the blank.
Figure 11:
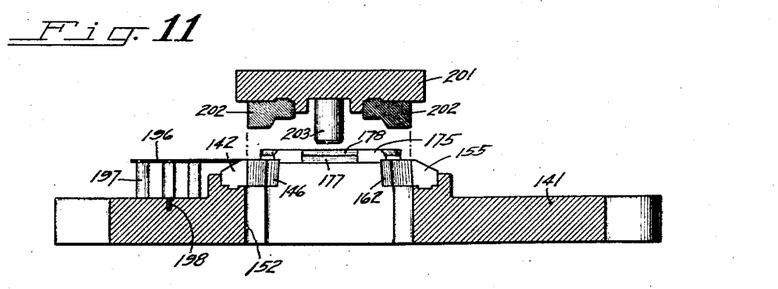
Fig. 11 is a transverse sectional view taken substantially along the line 11—11 in Fig. 10.

The blank 26 is now in proper shape and form for removal of the strips 33, 34, which is accomplished in a shearing mechanism roughly indicated in Figs. 10 and 11. Such a mechanism preferably comprises an apertured bolster plate 141 which supports the stationary cutting dies for this operation.

Forward cutting dies 142 are placed end to end along one side of the opening in the bolster plate 141 and are secured thereto by bolts 143. These dies have scroll and undulating cutting edges 144. End dies 145, 146 are also mounted toward the front of the machine being secured to the bolster plate by bolts 147.

The die 145 has a scroll cutting edge 148 which forms a continuation of the cutting edge 144 of the adjacent die 142. In a like manner the die 146 is provided with a cutting edge 149 which forms a continuation of the cutting edge 144 of its adjacent die 142, the die 146 also having an inset cutting edge 151 formed adjacent the cutting edge 149.

Along the rear wall of the aperture in the bolster plate and directly in line with the dies 142, are dies 155 secured by bolts 156 to the bolster plate, these dies having scroll cutting edges 157. An end die 158 is secured in place by bolts 159 being mounted adjacent one of the dies 155 and directly opposite the die 145. This die 158 is provided with a scroll cutting edge 161 which forms a continuation with the cutting edge 157 of the adjacent die 155.

In like manner an end die 162 is secured by bolts 163 directly opposite the die 146 being formed with a cutting edge 164 which provides a continuation of the cutting edge 157 of its adjacent die 155, the die 162 also having an inset cutting edge 165 which corresponds to the cutting edge 151 of the die 146.

A gage block 175 is secured by bolts 176 to the bolster plate 141 along each side of the bolster plate aperture and each gage block is formed with an inwardly projecting gage wall 177 which is tapered at 178 adjacent its top. These gage blocks are also provided with oppositely disposed curved gage walls 179, 181 relieved at their tops by countersunk tapered walls 182, 183. The tapered walls 178, 182, 183 form inclined leads on each side for proper centering of the blank 26 in the shearing die for the strip removing operation. The sheet in this gaged position (indicated by broken lines in Fig. 10) is supported along its front edge on a table 196 carried on sleeves 197 held in position on the bolster plate 141 by screws 198.

Suitable movable dies cooperating with the cutting edges of the stationary dies on the bolster plate 141, are carried in a movable slide member 201 (Fig. 11) which is raised and lowered in the usual manner. Alignment of these movable dies, designated generally by the numeral 202, is effected by downwardly projecting pilot posts 203 which enter into bushings 204 (Fig. 10) carried in vertical bores 205 formed in the blocks 175.

Figure 4:
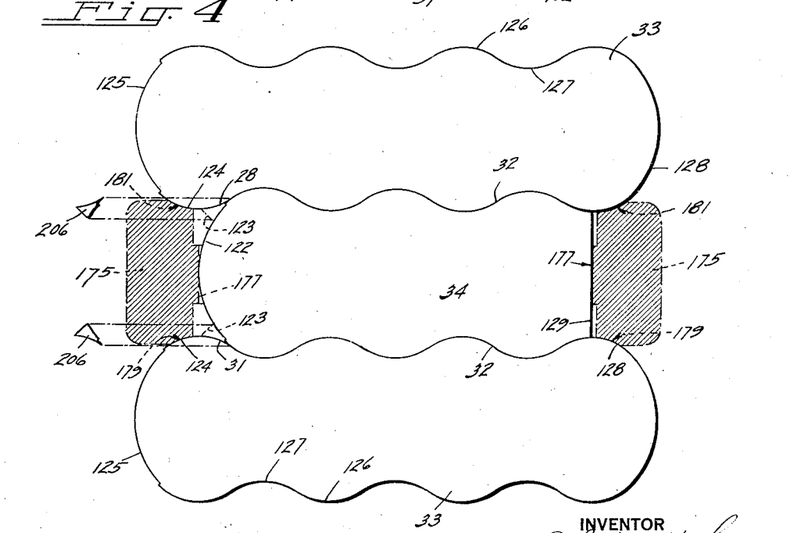
Fig. 4 is a view similar to Fig. 3 showing gaging parts and waste pieces, the view illustrating the results obtained in the third operation wherein the blank is divided into strips.

The gaging of the blank 26 is graphically illustrated in Fig. 4 wherein the straight edge 129 of the blank is engaged by the gage wall 177 of the right-hand block 175 and the edge 122 of the blank is engaged by the gage wall 177 of the left gage block 175. The curved edges 128 of the blank engage the gaging walls 179, 181 of the right-hand gage block 175. In like manner, the edges 124 are engaged by the walls 179, 181 of the left gage block 175. It will be observed that the slits 28 and 31 enter into and extend an adjacent edge 124 of the blank. This elongation of each line 124 permits removal of waste triangular pieces 206 adjacent the edges 123 when the slide 201 is lowered for the shearing operation, this being accomplished by the cutting action of the stationary cutting edges 151, 165 of the respective dies 146, 162 and their associated movable die parts.

The shearing operation performed with lowering of the slide 201, severs the central strip 34 from the two side strips 33 cutting along the lines of severance 32 in a scroll shaped undulating line corresponding with the long sides of the scroll edges 111. Removal of the waste triangular pieces 206, as will be noted by reference to Fig. 4, forms the rear end of the center strip 34 with an indented edge 122 which corresponds to the edge 125 of the side strips 33. This is to prevent slivering in the final blanking operation on the strip as will be fully explained hereinafter.

Figure 12:
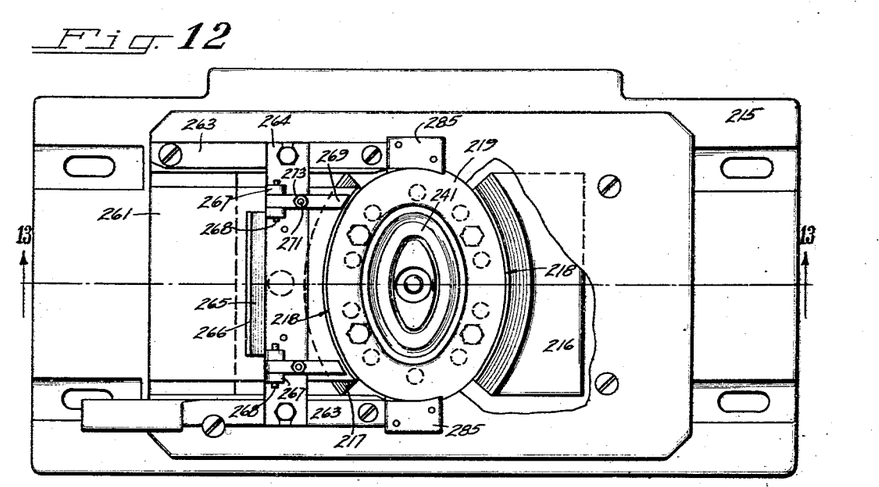
Fig. 12 is a plan view of a conventional drawing press mechanism.
Figure 13:
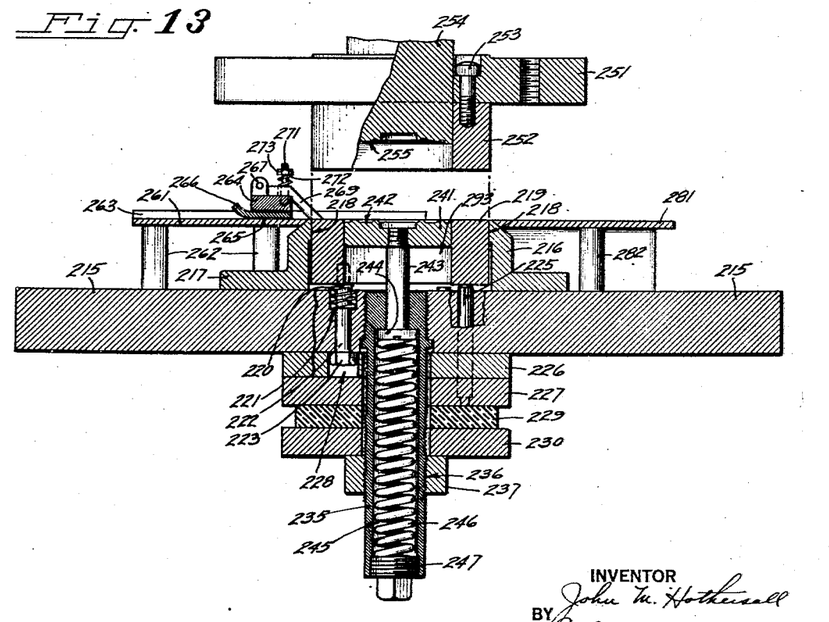
Fig. 13 is a longitudinal section of the same taken substantially along the line 13—13 in Fig. 12.

The mechanism for dividing the strips into container blanks 35 and drawing the blanks into containers 22 may comprise a conventional strip feed press. Figs. 12 and 13 illustrate such a machine capable of performing both cutting and drawing operations.

Such a press comprises a bolster plate 215 on which are mounted cutting die members 216, 217. These dies are spaced on opposite sides of a central axis and are provided with cutting walls 218 of proper contour for producing the outline of the container blank 35. Inside of and having slight movement relative to the die members 216, 217, is a draw ring 219 which is held in a normal raised position (Fig. 13) with its upper face flush with the top edge of the cutting dies 216, 217.

The draw ring 219 rests upon springs 220 located in counterbores 221 formed in the bolster plate 215 and each spring 220 surrounds a vertically extending bolt 222 which projects through a vertical bore in the bolster plate. The head 223 strikes against the lower surface of the bolster plate and limits the upward movement of the draw ring under the action of its springs 220 holding it at such time in its raised position.

The draw ring 219 is depressed during the cutting of a container blank from the end of a strip 33 or 34 and when approaching its lowered position strikes against the upper ends of a number of vertically extending pins 225 projecting through and having slight movement within the bolster plate 215. These pins 225 at their bottom ends extend through a spacer washer 226 located directly beneath the bolster plate 215 and into a pin plate 227 beneath the washer. The spacer washer 226 is provided with a series of clearance openings 228 which accommodates the heads 223 of the bolts 222 previously described. The pin plate 227 rests upon a resilient washer 229 preferably of rubber which is supported by a washer 230 located directly beneath.

A tubular stud 235 is located at the die's center, being threadedly engaged in the bolster plate and extending downwardly through the members 226, 227, 229, 230, this placing the stud along the intersection of the axes of the draw ring 219 and the cutting walls 218. The tubular stud 235 intermediate its length is threaded at 236 for the reception of a locknut 237 which engages the washer 230 and securely holds the members 226, 227, 229, 230 together. This construction provides a yielding stop element for the draw ring, the pressure on the pins 225 being resisted by the rubber washer 229.

A drawing pad 241 is located inside of the draw ring 219, the upper surface of the pad being preferably paneled at 242 to provide the necessary configuration desired in the bottom of the drawn container 22. This pad is mounted on the upper end of a bolt 243 and has vertical movement relative to the draw ring. To permit such movement the bolt 243 is extended downwardly through the upper end of the stud 235 and its head 244 is located in the upper portion of a longitudinally extending chamber 245 formed interiorly of the stud 235.

The head 244 rests upon the upper end of a compression spring 246 which is confined within the chamber 245 by a screw plug 247 threadedly engaged in the lower end of the stud. The spring 246 provides the proper resistance to accomplish the drawing operation for the formation of the container 22.

The movable cutting and drawing die parts of the apparatus may be carried in a suitable slide member 251 (Fig. 13) which may be of usual press construction. This slide 251 carries a punch ring 252 which is secured thereto by bolts 253. Ring 252 is of a size and shape corresponding with the draw ring 219 and has vertical movement in alignment with it.

A drawing anvil 254 is located interiorly of the punch ring 252 and has independent vertical movement relative to the punch and the slide. The lower face of the anvil 254 is paneled, as indicated at 255, to cooperate with the paneled surface 242 of the block 241 to impress the proper configuration in the container end.

A supporting plate or table 261 is mounted upon posts 262 carried by the bolster plate 215 and is located adjacent the feeding entrance of the strip 33 or 34 as it is introduced into the press mechanism. Guide bars 263 carried by the table 261 are spaced on opposite sides thereof and form a passageway for the introduction of the strip into the machine.

A crossbar 264 is mounted on the guide bars 263 and extends from one guide bar to the other providing a support for a top guide plate 265 mounted centrally of the passageway and directly above and spaced a slight distance from the upper surface of the table 261. This plate is turned upwardly at 266 to allow easy insertion of the strip in its passage to the die mechanism.

The bar 264 is also provided with lugs 267 which carry pintles 268 providing hinge connections for a pair of stop fingers 269 extending forward of the bar 264 and into normal contact with the upper surface of the table 261. Each finger 269 is provided with a clearance opening for a bolt 271 which extends upwardly from the bar 264 and is surrounded by a spring 272 confined between the upper part of its associated finger 269 and a locknut 273 threaded on the bolt.

This construction permits insertion of the sheet from the left-hand side as viewed in Figs. 12 and 13 at which time the fingers 269 shift on their pivots sufficiently to allow the sheet to enter therebeneath. The shape of the fingers 269 (Fig. 13) together with the action of the springs 272 prevents backward movement of the strip after it has been properly placed in the die and beneath the fingers.

A second table 281 is mounted on the opposite side of the die member 216 and is supported by posts 282 carried by the bolster plate 215. The upper surfaces of the tables 261, 281 are flush with the upper surfaces of the die members 216, 217, 219 and 241 which presents an unbroken floor for the sheet being placed in position.

Figure 5:
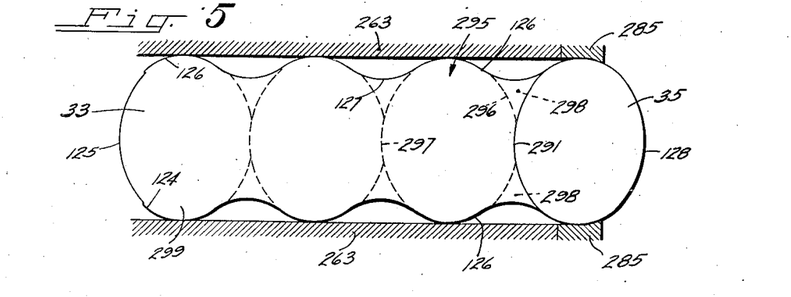
Fig. 5 is a diagrammatic view of one of the strips with gaging parts, the view illustrating the effect of the fourth blanking operation and the removal of a container blank from the strip.

A pair of gage blocks 285 are mounted on the table 261 on opposite sides of the die mechanism. These blocks form stops for the strip blocking its forward movement and placing its forward end into each cutting and drawing position. In Fig. 5 there is diagrammatically illustrated one of the side strips 33 in its gaged position preparatory to the first cutting and drawing operation. In this position the gages 285 engage the rounded crest 126 adjacent the forward edge 128, the gage bars 263 holding the strip in proper longitudinal alignment.

It will be observed by reference to Figs. 12 and 13 that the draw ring is thicker on one side (right-hand) than on the other which is to say that the cutting edge 218 of the die 216 if further removed from the longitudinal axis of the die mechanism than the cutting edge 218 of the die 217. In its first gaged position, the forward edge 128 of the strip is held a slight distance toward the left of the cutting edge 218 of the die 216, that is, the strip edge 128 is not moved into engagement with this cutting edge.

Lowering of the slide member 251 now takes place, the die member 252 (Fig. 13) engaging that part of the strip positioned beneath, clamping it against the upper surface of the draw ring 219. This clamping action continues while the container blank 35 is severed along a cutting line 291 (Fig. 5), the draw ring 219 being forced downwardly and the springs 220 of the draw ring yielding to permit this movement. The cutting wall 218 of the die 216 is not used at this first cutting operation since the strip does not extend into the zone of cutting as previously mentioned and the forward edge 128 of the strip is unaltered and remains as one side of the blank 35. No slivering of the edge of the strip takes place as might otherwise occur if the die cutting wall only imperfectly coincided with the front edge of the strip.

At the completion of the cutting or blanking of the blank 35 from the strip, the anvil 254 descends into engagement with the blank which is then further moved thereby. The clamping pressure of the members 252, 219 on the blank holds its outer edges in a slip grip and the anvil 254 then moves the central part of the blank downwardly forcing the block 241 downwardly against the action of the spring 246. This action draws the container blank into shell or cup form by withdrawing its clamped edge from its slip grip and bringing it into the chamber, indicated by the numeral 293 (Fig. 13), located on the interior of the draw ring 219.

As the member 241 strikes bottom against the bolster plate 215, continued downward movement of the anvil 254 shapes the bottom of the drawn shell to correspond to the paneling 242, 255 of the respective members 241, 254. The members 252, 254 are thereupon lifted and the springs 220, 246 restore the parts 219, 241 to normal position, thus ejecting the finished container from the machine. In producing a container of the shape illustrated in Figs. 6 and 7, this outer edge of the container blank is not fully drawn out from the slip grip and the resulting container 22 has an outwardly extending flange 294.

The strip 33 is now advanced toward the right (Fig. 5) for a second cutting or blanking operation and the forward oppositely disposed rounded crests 126 of its scrolled edges that were left in the strip by the removal of the first blank are engaged by the gage blocks 285. The blanking operation and the drawing operation which immediately follows are repetitions of the operations just described and a second container 22 is thus drawn from the second space, indicated by the numeral 295 in Fig. 5.

This container blank as removed from the strip, is not of a perfect oval form inasmuch as the cutting die 216 will function by cutting along lines 296. Inasmuch as the former cutting line 291 of the blank 35 overlaps these lines 296, there will be a slight irregularity in the forward edge 296 of the container blank 295. This container blank is cut along a rear edge indicated by the numeral 297.

Two triangular pieces are removed with the second cutting operation just described, these being located between and outlined by the cutting lines 291, 269, as illustrated in Fig. 5. Such triangular pieces designated by the numerals 298 are waste pieces and fall upon the table 281 from whence they are subsequently removed.

The third container obtained from the strip 33 under consideration, after the next cutting and drawing operation is of the same character as the blank 295, there being again produced a pair of waste triangular pieces 298. At the fourth or final cut of the strip 33, a container blank 299 is obtained which is slightly different in shape from either the container blank 35 or the blanks 295 in that the rear edge 125 is not in alignment with the edges 126, 124, produced in the strip at the time of its shearing operations.

This edge 125, during the final cutting operation just described, falls short of the cutting edge 218 of the die 217 and no cutting takes place along that side. This prevents slivering or feathering of the edge previously alluded to which would produce a ragged and undesirable edge if cutting actually took place along a cutting line which only imperfectly coincided with the rear edge of the strip.

The final drawn container produced from this blank as well as that produced from the blank 295 is slightly imperfect and these imperfections are manifested in the flange 294. These imperfections may be removed by a subsequent trimming of the container in the usual and preferred manner if desired, or in some cases the imperfections will not matter.

When cutting and drawing a central strip 34 in place of the strips 33, the same proceeding is followed, there being spaces for only three container blanks on the center strip. The first cutting and drawing operation, however, differs from the first operation on a strip 33 in that the straight edge 129 extends beyond the cutting edge 218 of the die 216 and this die is therefore utilized in the first cutting operation to produce the container blank. Inasmuch as the longitudinal scroll edges of the strip 34 are the same as the scroll edges of the strips 33 gaging and feeding of the same takes place in an identical manner as just described for the strip 34.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The process of producing a plurality of drawn containers from a sheet of material with a minimum of waste which comprises first shearing one-half section of a sheet of material and then reversing the sheet and shearing the other half to produce a blank having a scroll, undulating edge outline, cutting the blank along spaced undulating lines of severance producing a plurality of strips, cutting across the strips dividing them into individual container blanks and drawing each container blank into a drawn container.

2. The process of producing a plurality of drawn containers from a sheet of material with a minimum of waste which comprises first presenting a half section of a sheet of material to a shearing operation which outlines the section by providing it with a scroll edge, second reversing the sheet and presenting the remaining half section of the sheet to a shearing operation which outlines the same in a similar manner by also providing it with a scroll edge thereby producing a blank, third presenting the blank to a scroll cutting operation which divides it into strips of undulating and scroll formation, fourth presenting each strip to a succession of cutting and drawing operations which divide the strip into container blanks and then draw each container blank into a flanged drawn container.

3. The process of producing a plurality of drawn containers from a sheet of material with a minimum of waste which comprises presenting a half section of a sheet of material to a shearing mechanism while gaging it along a back and side edge of the other half section of the sheet which outlines the first half section with a scroll edge, thence reversing the sheet and presenting the second half section of the sheet to the said shearing mechanism while gaging it along a back and side scroll edge just formed which outlines the remaining section of the sheet with a corresponding scroll edge producing a blank therefrom, thence presenting the blank to a scroll cutting mechanism which removes a central strip having a scroll, undulating outline while forming side strips of similar outline from the remaining parts of the blank, thence presenting each strip to cutting and drawing mechanism which divides them into container blanks and draws the blanks into drawn containers.

4. The process of producing a plurality of drawn containers from a sheet of material with a minimum of waste which comprises presenting a sheet of material to slitting and shearing operations which outline a half section of the sheet with a scroll edge and which also cut through the sheet in its opposite half section to provide a slit corresponding in shape to a small section of the scroll outline, then reversing the sheet and again presenting it to said slitting and shearing operations which complete the scroll edge outline of the sheet and cut a second slit therein at the same time providing a blank, thence presenting the blank to a scroll cutting operation which divides it into strips along spaced undulating lines of severance which unite with the said slits to complete the outline, and finally presenting each strip to cutting and drawing operations which divide and form them into drawn container blanks.

5. The process of producing a plurality of drawn containers from a sheet of material with a minimum of waste which comprises cutting strips from a sheet of material each strip having an undulating, scroll outline and containing a row of container blank spaces, presenting each strip endwise to a cutting die which severs a container blank by overlapping the outline of the preceding cut to avoid waste of material, and drawing the cut container blank into a drawn container.

6. The process of producing a plurality of drawn articles from a sheet of material with a minimum of waste, which comprises trimming a sheet to give it predetermined scroll edges with rounded crests and troughs around substantially its entire perimeter, providing an inset edge upon a said rounded crest, dividing said sheet into a plurality of strips and cutting and drawing individual parts of said strips to form drawn articles.

7. The process of producing a plurality of drawn articles from a sheet of material with a minimum of waste, which comprises trimming a sheet to give it predetermined scroll edges with rounded crests and troughs substantially defining enlarged portions, providing an inset edge upon a said enlarged portion to prevent subsequent slivering, dividing said sheet along scroll lines into a plurality of strips, and cutting and drawing the enlarged portions of a said strip to form drawn articles.

8. The process of producing a plurality of drawn articles from a sheet of material with a minimum of waste, which comprises trimming a sheet to provide peripheral undulating scroll edges, dividing said sheet into strips, cutting and drawing individual parts of a said strip to form drawn articles, and preventing the cutting of a portion of a said individual part.

9. The process of producing a plurality of drawn articles from a sheet of material with a minimum of waste, which comprises trimming one-half of a sheet of material while making a preparatory cut in the other half of said sheet, then reversing the sheet and trimming the other half of said sheet and then shearing said trimmed sheet to provide a plurality of strips and cutting and drawing individual parts of said strips to form drawn articles.

10. The process of producing a plurality of drawn articles from a sheet of material with a minimum of waste, which comprises trimming one-half of a sheet of material to produce an undulating scalloped periphery while simultaneously removing recovery pieces from said one-half, then reversing the sheet and trimming the other half of the sheet while simultaneously removing recovery pieces from said other half, shearing said trimmed sheet to provide a plurality of strips, then cutting a said strip to provide a plurality of blanks and drawing said blanks into articles simultaneously with said last mentioned cutting operation.

JOHN M. HOTHERSALL.